United States Patent
Keller et al.

(10) Patent No.: US 10,528,151 B1
(45) Date of Patent: *Jan. 7, 2020

(54) OPTICAL HAND TRACKING IN VIRTUAL REALITY SYSTEMS

(71) Applicant: Facebook Technologies, LLC, Menlo Park, CA (US)

(72) Inventors: Sean Jason Keller, Bellevue, WA (US); Tristan Thomas Trutna, Seattle, WA (US); David R. Perek, Seattle, WA (US); Bruce A. Cleary, III, Bothell, WA (US); Brian Michael Scally, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/292,109

(22) Filed: Mar. 4, 2019

Related U.S. Application Data

(63) Continuation of application No. 15/288,453, filed on Oct. 7, 2016, now Pat. No. 10,261,592.

(60) Provisional application No. 62/239,138, filed on Oct. 8, 2015.

(51) Int. Cl.
*G06F 3/01* (2006.01)

(52) U.S. Cl.
CPC .................................. *G06F 3/017* (2013.01)

(58) Field of Classification Search
CPC ........... G06K 9/00013; G06K 9/00026; G06K 9/00087; G06K 9/00906; G06K 9/00912; G06K 9/2018; G06K 2009/0006; G06F 3/017
See application file for complete search history.

(56) References Cited

U.S. PATENT DOCUMENTS

| | | | |
|---|---|---|---|
| 5,097,252 A | 3/1992 | Harvill et al. | |
| 5,444,462 A | 8/1995 | Wambac | |
| 6,057,540 A | 5/2000 | Gordon et al. | |
| 6,128,004 A | 10/2000 | McDowall et al. | |
| 10,261,592 B2 * | 4/2019 | Keller | G06F 3/017 |
| 2001/0037059 A1 * | 11/2001 | Stone | A61B 5/0245 600/324 |
| 2003/0137489 A1 | 7/2003 | Bajramovic | |
| 2003/0184520 A1 | 10/2003 | Wei | |
| 2014/0031698 A1 | 1/2014 | Moon et al. | |
| 2016/0034742 A1 * | 2/2016 | Kim | H04B 1/385 382/124 |
| 2016/0054797 A1 | 2/2016 | Tokubo et al. | |

(Continued)

*Primary Examiner* — Mihir K Rayan
(74) *Attorney, Agent, or Firm* — Fenwick & West LLP

(57) ABSTRACT

A system tracks movement of the VR input device relative to a portion of a user's skin, track movement of the VR input device relative to a physical surface external to the VR input device, or both. The system includes an illumination source integrated with a tracking glove coupled to a virtual reality console, and the illumination source is configured to illuminate a portion of skin on a finger of a user. The system includes an optical sensor integrated with the glove, and the optical sensor is configured to capture a plurality of images of the illuminated portion of skin. The system includes a controller configured to identify differences between one or more of the plurality of images, and to determine estimated position data based in part on the identified differences.

20 Claims, 4 Drawing Sheets

(56) References Cited

U.S. PATENT DOCUMENTS

2016/0198995 A1\* 7/2016 Yeung .................. A61B 5/4528
600/595
2016/0313798 A1 10/2016 Connor \* cited by examiner

OPTICAL HAND TRACKING IN VIRTUAL REALITY SYSTEMS

CROSS REFERENCE TO RELATED APPLICATION

This application is a continuation of co-pending U.S. application Ser. No. 15/288,453, filed Oct. 7, 2016, which claims priority to U.S. Application No. 62/239,138, filed Oct. 8, 2015, both of which are incorporated by reference in their entirety.

BACKGROUND

The present disclosure generally relates to motion tracking, and specifically to using optical sensors for hand tracking in virtual reality or augmented reality applications.

Virtual reality (VR) is a simulated environment created by computer technology and presented to a user, such as through a VR system. Typically, a VR system includes a VR headset that provides visual and audio information to the user. However, when wearing the VR headset, the user is unable to see the user's hands or interact with the simulated environment presented by the VR headset with the user's hands. Conventional VR systems create virtual hands in the simulated environment and use a hand tracking system to track motion and positions of the user's hands. However, conventional hand tracking systems are often unable to accurately track positions of the user's fingers and thumbs, causing poor representation of movement of the user's fingers and thumbs by virtual hands of the user within the simulated environment.

SUMMARY

A system is configured to detect positions of a virtual reality (VR) input device (e.g., a tracking glove) in a VR environment, an augmented reality (AR) environment, a mixed reality (MR) environment, or some combination thereof. The system may track movement of the VR input device relative to a portion of a user's skin, track movement of the VR input device relative to a physical surface external to the VR input device, or both.

In some embodiments, the system includes an illumination source is integrated with the VR input device coupled to a virtual reality console, and the illumination source is configured to illuminate a portion of skin on a finger of a user. For example, the illuminated portion of the finger is a portion of skin around a joint of the user's finger. The system may include an optical sensor integrated with the VR input device. The sensor is configured to capture a plurality of images of the illuminated portion of skin. The system includes a controller configured to identify differences between some of the plurality of images. For example, the differences correspond to movement of the VR input device with respect to the illuminated portion of the user's skin (e.g., detachment of the VR input device from the user wearing the VR input device, slip of the VR input device from the user, etc.). In another example, the differences correspond to movement of the illumination portion of the skin (e.g., movement of the finger). The controller is also configured to determine estimated position data based in part on the identified differences. For example, the controller determines estimated position data based on differences among common features identified in the plurality of images captured by the optical sensor. In another example, the controller determines estimated position data based on displacement vectors.

In some embodiments, the system includes an additional illumination source configured to illuminate a portion of surface external to an exterior of the tracking glove, and an additional optical sensor configured to capture a plurality of images of the illuminated portion of the surface. For example, the additional optical sensor has a field of view external to an exterior surface of the VR input device, and captures movement of the VR input device relative to the exterior surface in the field of view. The controller is further configured to identify differences between some of the plurality of images, and the differences corresponding to movement of the tracking glove with respect to the surface. The controller determines estimated position data based in part on the identified differences and identifies one or more actions performed by the user associated with content presented to the user based in part on the identified movement. Example actions performed by the user with presented content include: repositioning a cursor within content presented to the user, selecting content presented to the user, navigating through content presented to the user, typing action performed by the user, or some combination thereof.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

System Overview

Figure 1:
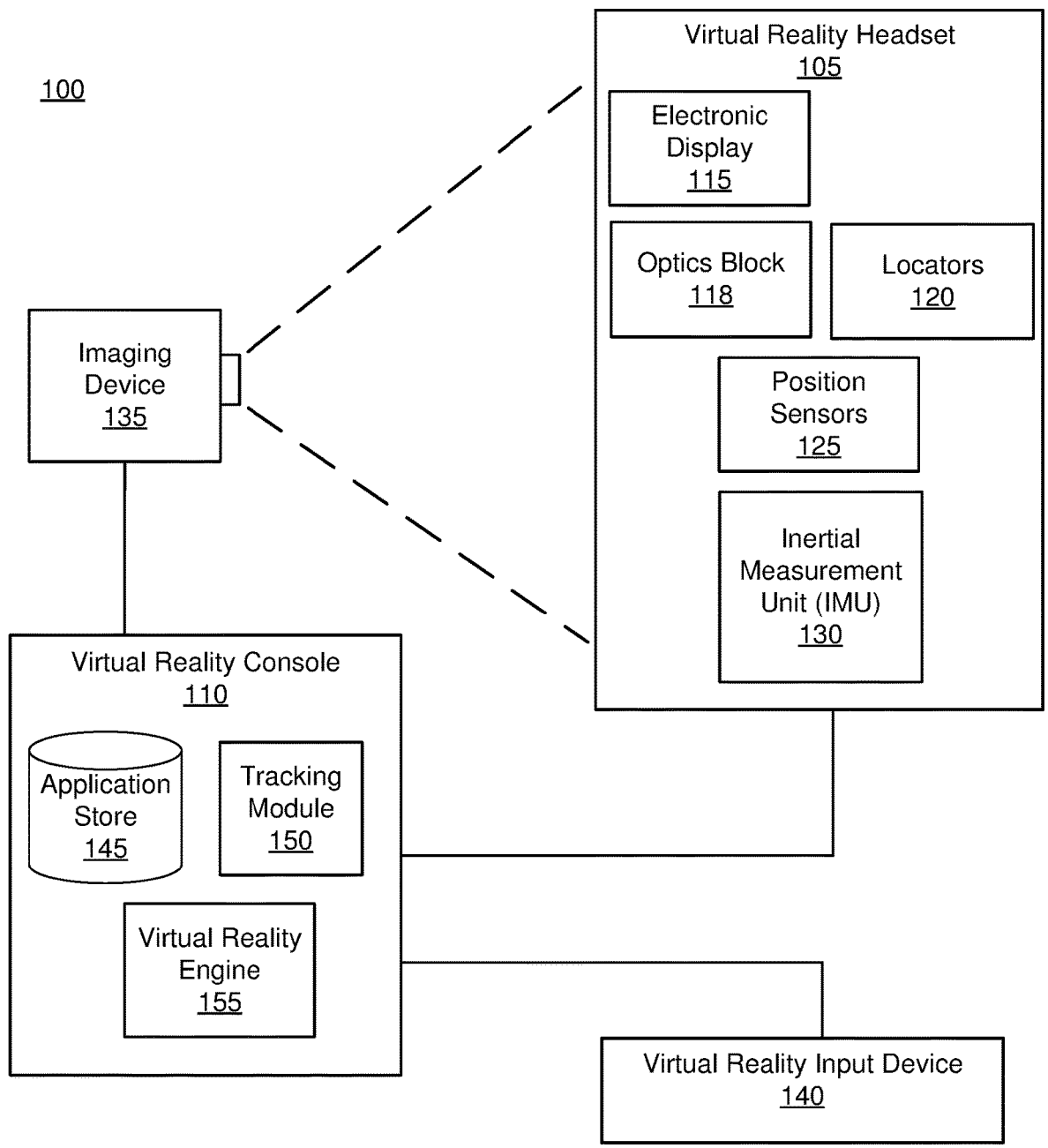
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input device 140 that are each coupled to the VR console 110. While FIG. 1 shows an example system 100 including one VR headset 105, one imaging device 135, and one VR input device 140, in other embodiments any number of these components may be included in the system 100. For example, there may be multiple VR headsets 105 each having an associated VR input device 140 and monitored by one or more imaging devices 135, with each VR headset 105, VR input device 140, and imaging device 135 communicating with the VR console 110. In alternative configurations, different and/or additional components may be included in the system environment 100. Similarly, functionality of one or more of the components may be distributed among the components in a different manner than is described here. For example, some or all of the functionality of the VR console 110 may be contained within the VR headset 105.

The VR headset 105 is a head-mounted display that presents content to a user. Examples of content presented by the VR headset 105 include one or more images, video, audio, or some combination thereof. In some embodiments, audio is presented via an external device (e.g., speakers and/or headphones) that receives audio information from the VR headset 105, the VR console 110, or both, and presents audio data based on the audio information. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the VR headset 105 may also act as an augmented reality (AR) headset. In these embodiments, the VR headset 105 augments views and of a physical, real-world environment with computer-generated elements (e.g., images, video, sound, etc.).

The VR headset 105 includes an electronic display 115, an optics block 118, one or more locators 120, one or more position sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies image light received from the electronic display 115, corrects optical errors associated with the image light, and presents corrected image light to a user of the VR headset 105. In various embodiments, the optics block 118 includes one or more optical elements. Example optical elements include: an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements from the optics block 118.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data indicating an estimated position of the VR headset 105 relative to an initial position of the VR headset 105 based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input device 140 is a device that allows a user to send action requests to the VR console 110. An action request is a request to perform a particular action. For example, an action request may be to start or to end an application or to perform a particular action within the application. An action request received by the VR input device 140 is communicated to the VR console 110, which performs an action corresponding to the action request. In some embodiments, the VR input device 140 is a tracking glove that tracks movement of a user's hand, which is further explained below in conjunction with FIGS. 2A and 2B. However, in other embodiments, the VR input device 140 may be a device tracking movement of another other portion, or portions, of the user's body. Additionally, the VR input device 140 may provide haptic feedback to the user in accordance with instructions received from the VR console 110. For example, the VR input device 140 provides haptic feedback when an action request is received, or the VR console 110 communicates instructions to the VR input device 140 causing the VR input device 140 to generate haptic feedback when the VR console 110 performs an action. The VR input device 140 is further described below in conjunction with FIG. 3.

In some embodiments, the VR input device 140 includes a set of locators similar to the locators 120 included in the VR headset 105, further described above. Locators included on the VR input device 140 may be imaged by the imaging device 135 to generate slow calibration data based on calibration parameters received from VR console 110, as described above regarding generation of slow calibration data from the locators 120 included on the VR headset 105. Slow calibration data includes one or more images showing observed positions of the locators included on VR input device 140 that are detectable by the imaging device 135. The locators on the VR input device 140 are located in specific positions on the VR input device 140 relative to one another and relative to a specific reference point on the VR input device 140. Similar to the locators 120 included on the VR headset 120 described above, locators on the VR input device 140 may be located on an outer surface of the VR input device 140 or beneath the outer surface of the VR input device 140, which is transparent to the wavelengths of light emitted or reflected by the locators included on the VR input device 140 or is thin enough not to substantially attenuate the wavelengths of light emitted or reflected by the locators included on the VR input device 140.

The VR console 110 provides content to the VR headset 105 for presentation to the user in accordance with information received from one or more of: the imaging device 135, the VR headset 105, and the VR input device 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions that, when executed by a processor, generates content for presentation to the user. Content generated by an application may be in response to inputs received from the user via movement of the VR headset 105 or the VR interface device 140. Examples of applications include: gaming applications, conferencing applications, video playback application, or other suitable applications.

The tracking module 150 calibrates the VR system environment 100 using one or more calibration parameters and may adjust one or more calibration parameters to reduce error in determining of the position of the VR headset 105 or of the VR input device 140. For example, the tracking module 150 adjusts the focus of the imaging device 135 to obtain a more accurate position for observed locators on the VR headset 105 or on the VR input device 140. Moreover, calibration performed by the tracking module 150 also accounts for information received from the IMU 130 or the control module 144. Additionally, if tracking of the VR headset 105 is lost (e.g., the imaging device 135 loses line of sight of at least a threshold number of the locators 120 on the VR headset 105), or tracking of the VR input device 140 is lost (e.g., the imaging device 135 loses line of sight of at least a threshold number of locators on the VR input device 140), the tracking module 150 re-calibrates some or all of the system environment 100.

The tracking module 150 tracks movements of the VR headset 105 or of the VR input device 140 using slow calibration information from the imaging device 135. For example, the tracking module 150 determines positions of a reference point of the VR headset 105 or of the VR input device 140 using observed locators on the VR headset 105 or on the VR input device 140, respectively, from the slow calibration information and a model of the VR headset 105 or a model of the VR input device 140, respectively. The tracking module 150 determines positions of a reference point of the VR headset 105 using position information from the fast calibration information. Additionally, the tracking module 150 determines positions of an alignment point of the VR input device 140 using position information received from the VR input device 140, as further described below in conjunction with FIG. 3. Additionally, in some embodiments, the tracking module 150 may use portions of the fast calibration information, the slow calibration information, or some combination thereof, to predict a future location of the VR headset 105. Similarly, the tracking module 150 may use portions of the slow calibration data, the position information from the VR input device 140, or some combination thereof, to predict a future location of the VR input device 140.

The VR engine 155 executes applications within the VR system environment 100 and receives position information, acceleration information, velocity information, predicted future positions, or some combination thereof, from the VR headset 105 or the VR input device 140 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Similarly, if information received from the VR input device 140 indicates the user's hand makes a thumbs-up gesture, the VR engine 155 generates content based on the identified thumbs-up gesture, such as a visual representation of a hand making a thumbs-up gesture for presentation by the VR headset 105. Additionally, in some embodiments, if the received information indicates that the VR input device 140 detaches or slips from the user's hand, the VR engine 155 generates content indicating the VR input device 140 has lost contact with the user's hand for presentation by the VR headset 105. Additionally, the VR engine 155 performs an action within an application executing on the VR console 110 in response to an action request received from the VR input device 140 and provides feedback to the user that the action was performed. The provided feedback may be visual or audible feedback via the VR headset 105. For example, the VR engine 155 receives an action from the VR input device 140 to open an application, so the VR engine 155 opens the application and presents content from the application to the user via the VR headset 105.

Example VR Input Device

Figure 2A:
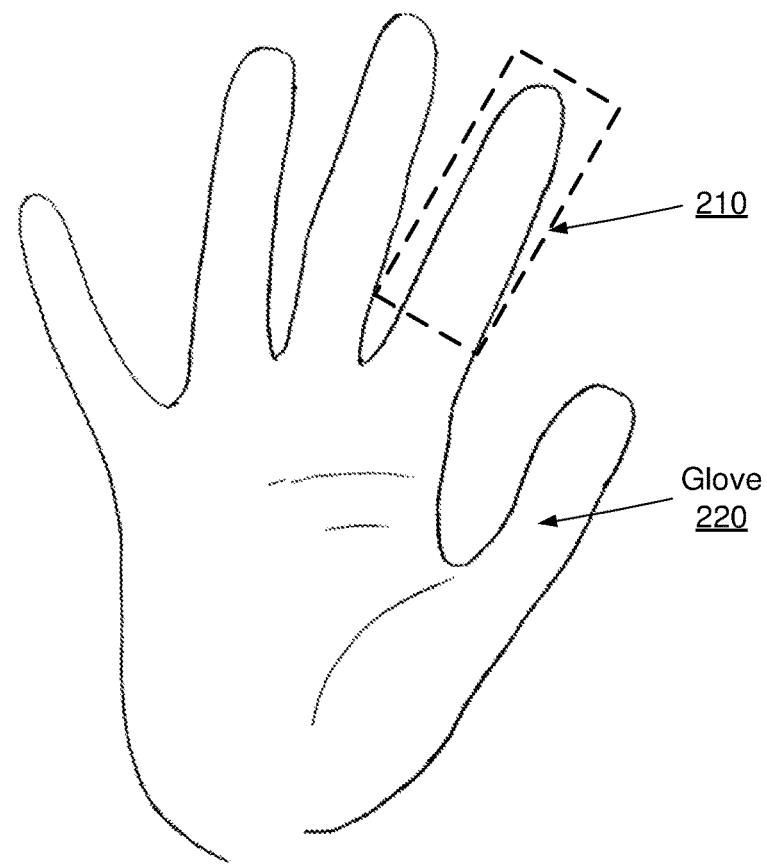
FIG. 2A illustrates a virtual reality input device, in accordance with an embodiment.

FIG. 2A illustrates an example of a VR input device 140 that is a glove 220. The glove 220 may be manufactured in different sizes to fit different size hands of users. An interior and an exterior of the glove may be made from one or more materials allowing tracking while preventing shifting or slipping during operation, such as fabric, leather, woven textiles, non-woven textiles, or some combination thereof. In some embodiments, the one or more materials may be coated or impregnated with elastomers. A finger portion 210 of the glove is further explained in conjunction with FIG. 2B.

Figure 2B:
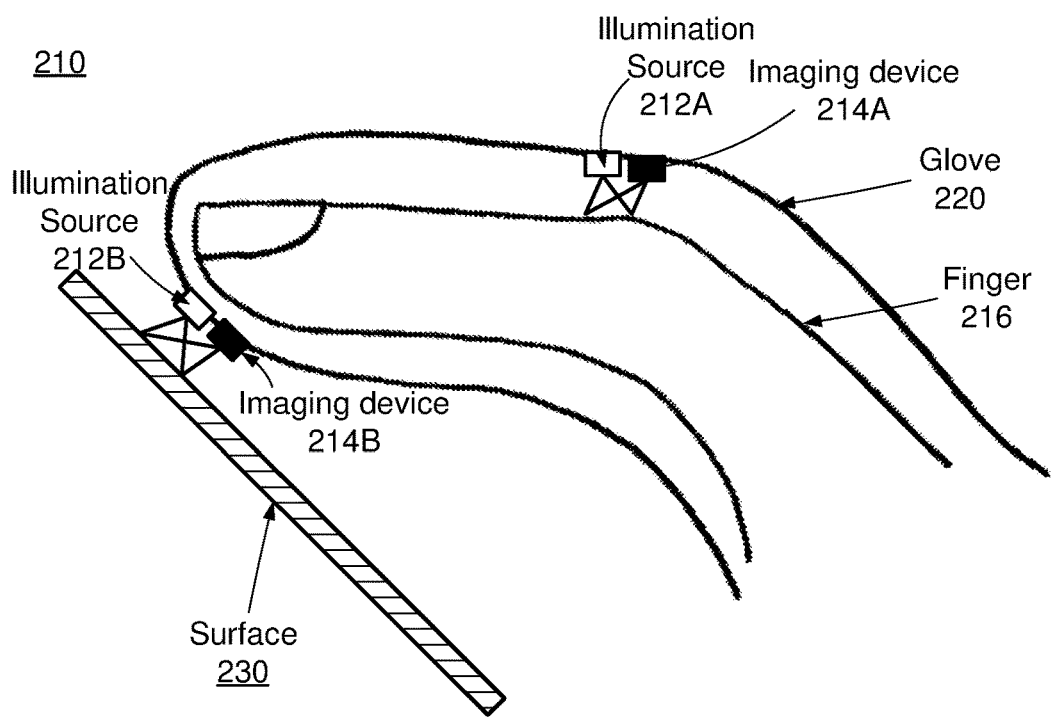
FIG. 2B illustrates a cross section of a portion of the virtual reality input device of FIG. 2A, in accordance with an embodiment.

FIG. 2B illustrates a cross section of one embodiment of a portion of the virtual reality input device of FIG. 2A. The glove 220 includes one or more illumination sources 212A, 212B and imaging devices 214A, 214B to track displacement of the glove 220 with respect to a portion of the user's body (e.g., a portion of the user's skin) and to track movement of the user's body, such as the user's finger 216. An illumination source 212A illuminates a portion of skin around a joint of the user's finger 216. Light from the illumination source 212A is reflected from the illuminated skin and collected by the imaging device 214A. When the glove 220 moves, the imaging device 214A captures multiple frames of the illuminated skin and sends the captured images to a control module coupled to or included in the glove 220, which determines a position of the glove 220 with respect to the illuminated skin, further described below in conjunction with FIG. 3. When the finger 216 moves (e.g., bends), the imaging device 214A captures multiple frames of the movement of the finger 216 and sends the captured images to the control module, which determines position or orientation of the finger 216, as further described below in conjunction with FIG. 3.

Additionally, the glove 220 includes an illumination source 212B and an imaging device 214B to identify interactions by the glove 220 with an environment external to an exterior of the glove 220, such as with a surface 230. Interactions by the glove 220 with the environment external to the glove 220 correspond to actions performed by an application presenting content to the user in various embodiments. For example, an application associates various interactions by the glove 220 with the external environment with various actions, such as moving a cursor or pointer within the application, selecting content presented by the application, or navigating through content presented by the application. In various embodiments, the illumination source 212B illuminates a portion of the surface 230, which may be smooth or rough. As further described below in conjunction with FIG. 3, the imaging device 214B captures images of the illuminated portion of the surface 230, and the VR input device 140 determines one or more physical properties of the portion of the glove 220 from the images received from the imaging device 214B. The VR input device 140 identifies movement of the portion of the glove 220 relative to the physical surface 230 based on changes in one or more of the physical properties. A physical property is any property of matter or energy that can be measured. Example physical properties include: force, magnetism, capacitance, velocity, volume, and so forth. In some embodiments a predetermined pattern may be used for illumination. The predetermined pattern allows tracking motions or capturing depth information. For example, a structured illumination pattern may be used to detect depth information of a portion of a user's skin. The depth information may be used for tracking positions of the glove 220 or the finger 216. For another example, laser illumination can be used to project a speckle pattern onto the surface that may be used as structured illumination. In an alternative configuration, the predetermined illumination pattern may be different depending on movement detection.

Estimation of Positions and Mouse Functions

Figure 3:
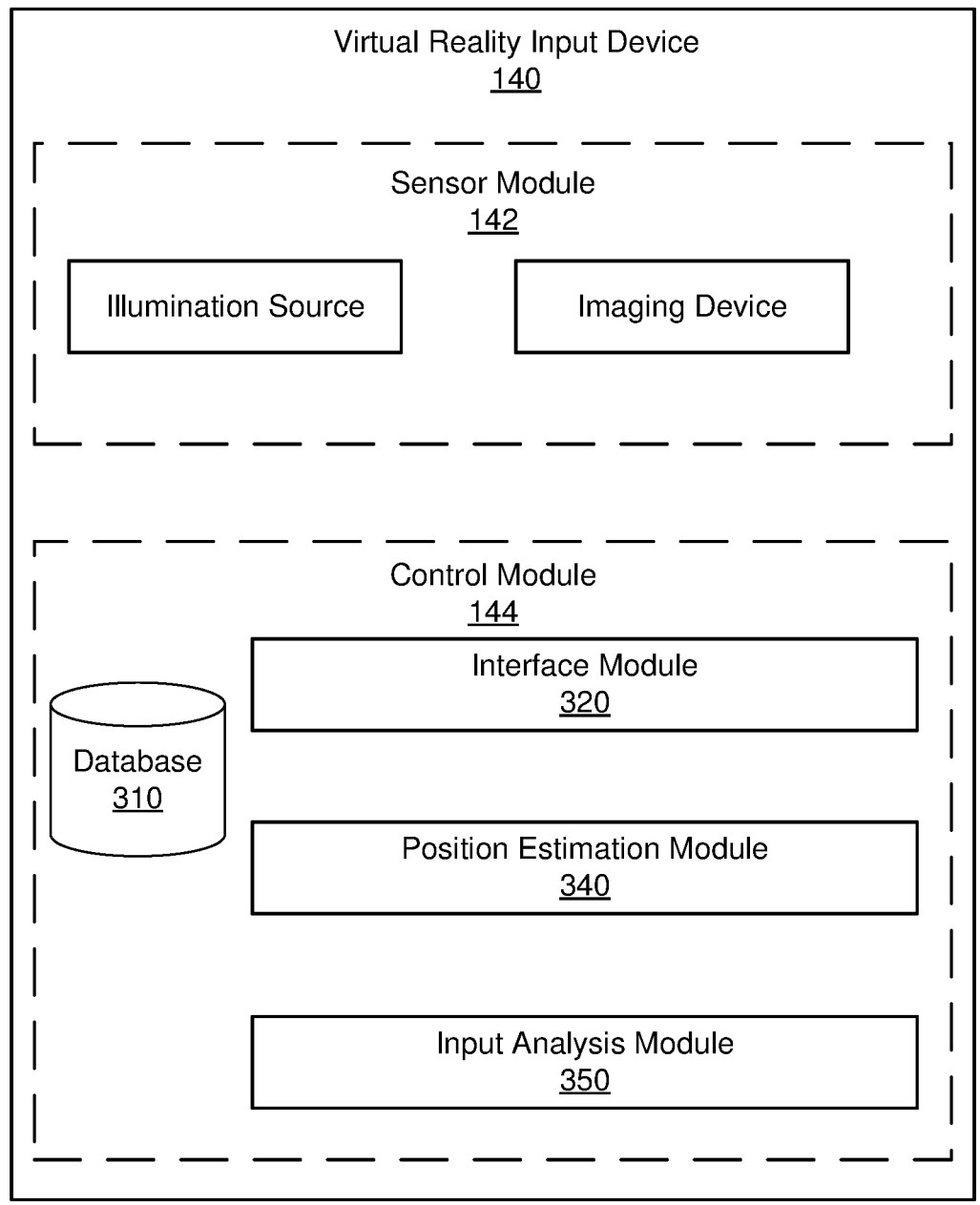
FIG. 3 is a block diagram of the virtual reality input device in a virtual reality system, in accordance with an embodiment.

FIG. 3 is a block diagram of one embodiment of the VR input device 140 in the VR system illustrated in FIG. 1. The VR input device 140 is an article of clothing including one or more internal optical sensors that monitor portions of a user's skin and determine location information of portions of the user's body based on changes in the monitored portions of skin. For example, the VR input device 140 is a tracking glove, tracking pants, a tracking sleeve, or another article of clothing. For example, a tracking glove tracks motions of the user's hand using one or more internal optical sensors that monitor movement of the user's skin relative to the one or more internal optical sensors in the tracking glove. In another example, the tracking glove tracks motions of the glove using one or more internal optical sensors that monitor movement of the glove relative to the user's skin.

An internal optical sensor is an optical sensor having a field of view that includes a portion of a user's skin. In some embodiments, the internal optical sensor includes an imaging device. Examples of the imaging device include one or more cameras, one or more video cameras, another device capable of capturing images including portions of skin, or some combination thereof. For example, the imaging device is an infrared (IR) camera or another device capable of capturing thermal images using infrared radiation. In some embodiments, the internal optical sensor includes one or more illumination sources and one or more an imaging devices. The internal optical sensor and an illumination source are further described below.

In some embodiments, the VR input device 140 includes one or more external optical sensors having fields of view external to an exterior surface of the VR input device 140. Capturing information external to the exterior surface of the VR headset allows the VR input device 140 to identify action requests for communication to the VR console 110 based on movement of the user captured by the VR input device 140 (e.g., movement of a user's hand identified by the VR input device 140). An external optical sensor may capture data from a physical surface external to the exterior surface of the VR input device 140. The surface may have various roughness (e.g., smooth, rough). In some embodiments, the external optical sensor includes an imaging device. Example imaging devices include: one or more cameras, one or more video cameras, other devices capable of capturing images including portions of physical surface, or some combination thereof. In some embodiments, the external optical sensor includes one or more illumination sources as well as one or more imaging devices.

In the example of FIG. 3, the VR input device 140 includes a sensor module 142 and a control module 144. Some embodiments of the VR input device 140 have different components than those described in conjunction with FIG. 3. Similarly, the functions described in conjunction with FIG. 3 may be distributed among other components in the VR system environment 110 in different manners in other embodiments. For example, some or all of the functionality provided by the control module 144 may be performed by the VR console 110 in some embodiments.

The sensor module 142 detects displacement of the VR input device 140 with respect to skin of a user and includes an illumination source and an imaging device. The illumination source illuminates a region of interest (ROI) of a user's skin that affects displacement of the VR input device 140 relative to the skin. In an embodiment where the VR input device 140 is a tracking glove, the illuminated ROI may be a portion of the skin on a user's hand, a portion of palmar skin of the user's hand, a portion of dorsal skin of the user's hand, or any other area of skin area affecting displacement of the VR input device 140 relative to the skin. The imaging device detects reflected light from the illuminated ROI and captures multiple images as the VR input device 140 moves. In some embodiments, the imaging device detects transmitted light from the illuminated ROI. The illumination source can be different types of light sources in various embodiments. Example light sources include: a light emitted diode (LED), a laser diode, or other type of light emitting device. The illumination source has a narrow- or intermediate-bandwidth and may provide pattern illumination or point illumination depending on the type of illumination source and imaging device. In some embodiments, the illumination source also provides visible light or non-visible light (e.g., near infrared or infrared light), depending on the spectral sensitivity of the imaging device and other factors, such as depth penetration or skin absorption and scattering.

The imaging device is a device that converts light into electronic signals. The imaging device is capable of measuring changes in light, such as changes related to optical properties of the light (e.g., intensity, phase, polarization, wavelength and spectral distribution). Additionally, the imaging device may detect a bend of slight change in direction. The spectral sensitivity of the imaging device can be in the visible band (~380 nm to 750 nm), in the infrared (IR) band (~750 nm to 1 mm), in the ultraviolet band (10 nm to 380 nm), some other portion of the electromagnetic spectrum, or some combination thereof. The imaging device may have various resolutions and frame rates to provide different tracking smoothness or precision. In some embodiments resolution of the imaging device is approximately 16×16 pixels or less pixels and the frame rate of the image device is approximately 1 kilo-Hertz (kHz) or higher frame rate, allowing for rapid imaging so sequential images overlap, simplifying determination of position information from the images. In one embodiment, the imaging device is monochromatic.

In some embodiments, the sensor module 142 may not only perform imaging but also perform processing. For example, the sensor module 142 not only includes constructing a raster from a plurality of imaging devices (e.g., a single imaging device, or an array of imaging devices) but also includes hardware designed into the sensor module 142 that allows for corresponding optical flow information to be derived from the sensor module 142 and corresponding interface hardware. Optical flow describes a pattern of motions of the ROI or an imaging device caused by a relative motion between the imaging device and the ROI (e.g., an illuminated portion of a user's skin, an illuminated portion of a physical surface). Examples of the designed hardware include pixel hardware design, or any other suitable hardware performing imaging and processing algorithms to compute optical flow. In some embodiments, the sensor module 142 allows one imaging device get more than two degrees of freedom in position, e.g., translational motion (forward/back, up/down, left/right), and rotational motion (e.g., pitch, yaw, roll). For example, the imaging device may measure a pixel width/shape of an illumination cone to determine more than two degrees of freedom in position.

The sensor module 142 may include one or more optical elements for providing light from the illumination source to the imaging device. Example optical elements include: an aperture, a lens, a mirror, a filter, a prism, a polarizer, or another suitable optical element affecting illumination and light collection, or some combination thereof. The sensor module 142 may include combinations of different optical elements. For example, the sensor module 142 includes a collimator comprising mirrors or lenses for aligning light from the illumination source in a specific direction. As another example, the sensor module 142 includes a beam expander comprising prisms or lenses for expanding a light beam to illuminate an area. Additionally, the sensor module 142 may include imaging lenses for focusing reflected lights from the ROI to the imaging device. Additionally, the sensor module 142 may include one or more electronic circuits (e.g., a printed circuit board (PCB), an integrated circuit (IC)) that collect electronic signals from the imaging device and transfer the electronic signals to the control module 144. The sensor module 142 may include a power supply and a power controller for the illumination source and the imaging device. In other embodiments, any number of the preceding components may be included in the sensor module 142. For example, the sensor module 142 includes multiple illumination sources to illuminate a ROI or to illuminate multiple ROIs, as well as multiple imaging devices to capture light reflected from the ROI or from multiple ROIs. In alternative configurations, different and/or additional components may be included in the sensor module 142.

In embodiments where the VR input device 140 is a tracking glove, the sensor module 142 collects data describing movement of fingers of a user wearing the tracking glove. If the VR input device 140 is a tracking glove, the sensor module 142 may be positioned on multiple fingertips or different sensor modules 142 may be positioned on different fingertips. For example, the illumination source of the sensor module 142 illuminates an ROI corresponding to a particular joint of a user's finger and captures data describing a degree of bending of the joint. The sensor module 142 may capture information describing movement of more than one finger.

In another embodiment, the sensor module 142 captures information describing interactions by the user with content presented to the user by the VR system environment 100. Example interactions by the user with presented content include: movement of a cursor or a pointer presented by the VR system environment 100, selecting a portion of content presented by the VR system environment 100 (e.g., selecting an object presented to the user), navigating through content presented by the VR system environment 100, or any other suitable interaction with content presented to the user. In the example where the VR input device 140 is a tracking glove, the sensor module 142 is mounted around one fingertip of the tracking glove or mounted on an exterior surface of the tracking glove near a finger pad of the user. This placement on the tracking glove allows the tracking glove to detect movement of one or more fingertips or finger pads with respect to a physical surface external to the exterior surface of the tracking glove. The illumination source of the sensor module 142 illuminates a portion of the physical surface external to the exterior of the tracking glove and captures images of the physical surface that are communicated to the control module 144, further described below. Based on the captured images of the physical surface, the control module 144 determines movement of the tracking glove (or other VR input device 140) relative to the physical surface external to the exterior of the tracking glove. For example, the control module 144 identifies one or more physical properties of the fingertip or finger pad of the user wearing the tracking glove from the images received from the imaging device and identifies movement of the fingertip or finger pad relative to the physical surface based on changes in one or more of the physical properties. A physical property is any property of matter or energy that can be measured. Example physical properties include: force, magnetism, capacitance, velocity, volume, and so forth. In some embodiments, the sensor module 142 allows one sensor get more than two degrees of freedom in position, e.g., translational motion (forward/back, up/down, left/right), and rotational motion (e.g., pitch, yaw, roll). In some embodiments, the sensor module 142 includes other types of sensors to capture data describing physical properties of the fingertip, finger pad, or other portion of the user's body relative to the physical surface. Examples of other types of sensors include: electromagnetic sensors, piezoelectric sensors, force sensors and so forth. In some embodiments, sensor modules 142 or portions of the sensor module 142 are positioned at different locations of the VR input device 140 (e.g., at different fingertips of a tracking glove) to track movement of different portions of the user's body relative to the physical surface external to the VR input device 140. The sensor module 142 communicates captured information to the control module 144 for identifying interactions with content presented to the user by the VR system environment 100 based on positioning of options of the VR input module 140 relative to a surface external to the VR input module 140.

The control module 144 determines positions of the VR input device 140 relative to portions of the user's skin illuminated by the sensor module 142 or movement of the VR input device 140 relative to a physical surface external to the VR input device 140. For example, a position of the VR input device relative to an illuminated portion of the user's skin corresponds to movement of the VR input device 140 relative to the illuminated portion of skin or to movement of the illuminated portion of skin relative to the VR input device 140. The movement of the VR input device 140 relative to the illuminated portion of skin may be used to determine if the VR input device 140 has changed its configuration with respect to a user's hand. For example, the VR input device 140 detaches or slips from the user's hand. The VR input device 140 acts as a proxy for the user's hand, if slipping occurs, there will be an offset between the rendered representation of the hand and the true pose of the hand. The control module 144 can determine the offset based on sensor data from sensor module 142 for compensating changes of glove configuration during use as further explained described below.

The control module 144 categorizes sensor data into motion data and touch data. Motion data describes the movement of the VR input device 140 with respect to a ROI of skin (or vice versa) and/or a physical surface, and the control module 144 determines positions of the VR input device 140 relative to the user's skin or of the user's skin relative to the VR input device 140 or of or the VR input device 140 relative to a surface external to the VR input device 140. Touch data describes changes of physical properties based on data captured by the sensor module 142, and is used by the control module 144 to determine actions corresponding to interactions with content. In some embodiments, the control module 144 determines actions corresponding to interactions with content based on motion data, on touch data, or on a combination of motion data and touch data. In some embodiments, the control module 144 communicates with the VR console 110. For example, the control module 144 provides estimates of position of the VR input device 140 and actions corresponding to interactions with presented content by the VR input device 140 to the VR console 110 and receives one or more calibration parameters from the VR console 110.

The control module 144 estimates positions of the VR input device 140 or positions of portions of the VR input device 140 using data obtained from the sensor module 142. In the example shown by FIG. 3, the control module 144 includes a database 310, an interface module 320, a position estimation module (PEM) 340, and an input analysis module (IAM) 350. Some embodiments of the control module 144 have different components than those described in conjunction with FIG. 3. Similarly, functions of the components described in conjunction with FIG. 3 may be distributed among other components in the VR system environment 100 in a different manner than described in conjunction with FIG. 3. For example, some or all of the functionality described as performed by the control module 144 may be performed by the VR console 110.

The database 310 stores calibration parameters from the VR console 110 and sensor data from sensor module 142. Additionally, the database 310 includes analysis data from PEM 340 and IAM 350 describing movement data of the VR input device 140 with respect to the skin of the user as well movement data of the user's skin relative to the VR input device 140. In some embodiments, the database 310 also stores data describing movement of the VR input device 140 with respect to a physical surface external to an exterior of the VR input device 140 and data describing physical properties obtained from the sensor module 142.

The interface module 320 communicates with the sensor module 142, the VR console 110, the database 310, the PEM 340, and the IAM 350. For example, the interface module 320 receives data collected by the sensor module 142 and categorizes the received data as motion data or touch data. The interface module 320 communicates the motion data and the touch data to the database 310 for further processing and analysis. Additionally, the interface module 320 provides data from the sensor module 142 to the PEM 340 and to the IAM 350 for analysis and stores analysis data from the PEM 340 and from the IAM 350 in the database 310. The interface module 320 also receives calibration parameters from the VR console 110 and communicates data from the sensor module 142 and analyzed data from the PEM 340 and from the IAM 350 to the VR console 110.

In some embodiments, the PEM 340 picks frame to frame correspondence, and then returns a displacement vector. The PEM 340 estimates a position of the VR input device 140 relative to a portion of the user's body using the displacement vectors. For example, for a set of image frames (e.g., three sequential image frames) having a corresponding set of displacement vectors (e.g., one representing the displacement from the first image frame to the second image frame, and another representing the displacement of the second image frame to the third image frame). The PEM 340 sums the set of displacement vectors to obtain a total displacement vector indicating a change in position of the VR input device 140 relative to the user.

In alternate embodiments, PEM 340 estimates positions of the VR input device 140 relative to portions of the user's body by identifying differences in a series of images captured by the sensor module 140 that captures an illuminated portion of the user's skin. Differences between images in the series correspond to movement of the illuminated portion of skin, and differences between images may be determined based on locations, orientations, or any other suitable parameter affecting positions. For example, two images are captured sequentially as the VR input device 140 moves relative to a portion of the user's skin. The PEM 340 identifies common features within each image and identifies differences between the common features in the different images to estimate displacement of the features from image to image. Various data analysis methods (e.g., image correlation or image registration) may be used to compare differences between successive images to calculate displacement. Based on identified differences between common features in different images, the PEM 340 calculates displacement of various features and translates the displacement into positions in a VR environment. The PEM 340 may estimate a position of the VR input device 140 relative to an alignment point. The PEM 340 may also estimate a position of offset between the rendered representation of the hand and the true pose of the hand relative to the alignment point. In some embodiments, the alignment point is a point within the VR input device 140. For example, if the VR input device 140 is a tracking glove, the alignment point is a point of a finger pad of the tracking glove. The PEM 340 receives an input calibration parameter specifying an initial position of the alignment point from the VR console 110. In various embodiments, the PEM receives a next calibrated position of the alignment point and updates the initial position of the alignment point to the received next calibrated position, reducing accumulated error between an estimated position and the initial position of the alignment point. In another embodiment, multiple alignment points may be used. Similarly, if the VR input device 140 is a tracking glove, the PEM 340 may estimate positions of fingers based on differences of features in different images as fingers move.

The IAM 350 identifies interactions with content presented to the user by the VR system environment 100 based on motion data and touch data obtained by the VR input device 140. Motion data describes the movement of the VR input device 140 relative to a surface external to the VR input device 140, while touch data describes changes of physical properties based on data captured by the sensor module 142. The IAM 350 combines the motion data with touch data to determine one or more actions corresponding to interactions with presented content. For example, if the VR input device 140 is a tracking glove, if the IAM 350 determines a translational movement of a fingertip relative to the external surface occurred without detecting at least a threshold pressure between the fingertip and the external surface, the IAM 350 determines the user performed an action that repositions a cursor within content presented to the user. As another example for a tracking glove, if the IAM 350 determines movement of a fingertip in a direction perpendicular to the external surface and at least a threshold pressure between the fingertip and the external surface, the IAM 350 identifies an action by the user that selects content (e.g., an object) presented to the user. As another example where the VR input device 140 is a tracking glove, if the IAM 350 determines motion of the fingertip parallel to the external surface and at least a threshold pressure between the fingertip and the external surface, the IAM 350 identifies an action by the user to navigate through content presented to the user (e.g., scroll through content presented to the user). However, any other suitable action interacting with presented content corresponds to any suitable determined motion of the VR input device 140 in various embodiments. The IAM 350 may identify certain actions based on motion data and/or touch data captured from different portions of the VR input device 140. For example, motion data and touch data is captured from different fingertips of a tracking glove, and the IAM 350 identifies an action to the VR console 110 corresponding to the combination of motion data and touch data from different fingertips (e.g., identifies a typing action based on detecting at least a threshold amount of pressure between the fingertip and the external surface for a threshold length of time by multiple fingertips). The IAM 350 stores the identified action interacting with content presented to the user in the database 310, while the interface module 320 receives the identified action and communicates the identified action to the VR console 110 to execute the identified action.

Figure 4:
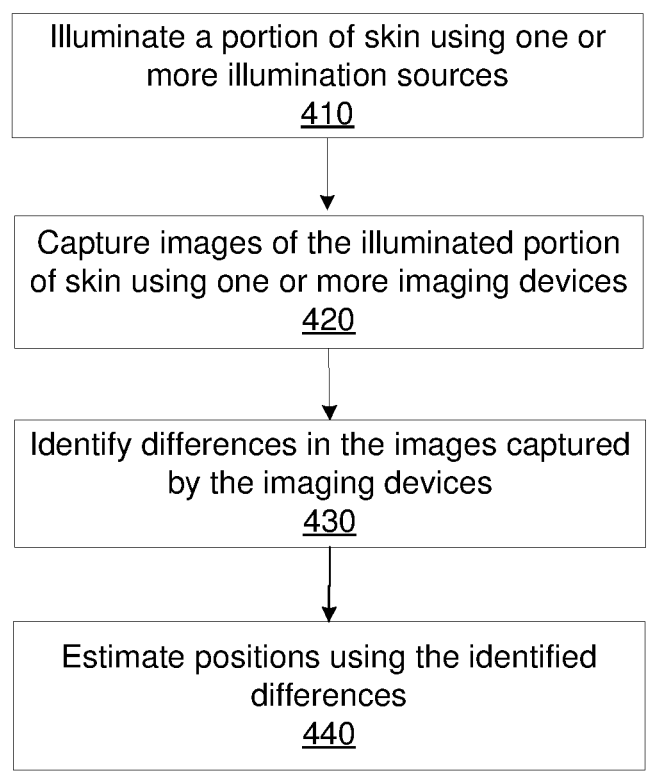
FIG. 4 is a flowchart of a process for tracking movements of a portion of skin through a motion tracking device, in accordance with an embodiment.

FIG. 4 is a flowchart of one embodiment of a process 400 for tracking movements of a portion of skin of a user, in accordance with an embodiment. The process 400 may be performed by the VR input device 140 in some embodiments. Alternatively, other components may perform some or all of the steps of the process 400. Additionally, the process 400 may include different or additional steps than those described in conjunction with FIG. 4 in some embodiments or perform steps in different orders than the order described in conjunction with FIG. 4.

The VR input device 140 illuminates 410 a portion of skin of a user (e.g., skin on a finger of the user proximate to the VR input device 140) using one or more illumination sources and captures 420 images of the illuminated portion of skin via one or more imaging devices, as described above in conjunction with FIGS. 2B and 3. The VR input device 140 identifies 430 differences between various images captured by the imaging devices. Based on the identified differences, the VR input device 140 identifies movement of the illuminated portion of skin. For example, two images of a finger of a user proximate to the VR input device 140 are sequentially captured 420 and common features within each image are identified. Based on differences between common features in each image, displacement of the common features between the captured images are determined. Differences between common features in the different images may be determined based on changes in locations of the common features in different images, changes orientations of the common features in different images, or based on any other suitable parameter affecting positions of a common feature. Using the identified differences between the captured images, the VR input device 140 estimates 440 positions. For example, the VR input device 140 calculates displacement using the identified differences and translates the displacement into positions in a VR environment.

In some embodiments, the process 400 described in conjunction with FIG. 4 is performed by a motion tracking device. For example, a motion tracking device is an article of clothing modified to act as a motion tracking device (e.g., tracking pants). Hence, the illuminated portion of skin may correspond to portions of skin of various joints of a user's body (e.g., knuckles, elbows, shoulders, hip, knees, and ankles).

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. For example, in some embodiments, the sensor module 142 may include designed hardware for imaging and image processing that computes optical flow information. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A wearable device comprising:
   an illumination source integrated with the wearable device, the illumination source configured to illuminate a portion of skin on a finger of a user, wherein a location on the wearable device is in contact with a corresponding location on a body part of the user;
   an optical sensor integrated with the wearable device and configured to capture a plurality of images of the illuminated portion of skin; and
   a controller configured to:
      identify differences between some of the plurality of images, the differences corresponding to movement of the wearable device with respect to the illuminated portion of skin, and
      determine estimated position data for the wearable device based in part on the identified differences, and
      determine that the location on the wearable device has moved with respect to the corresponding location on the body part of the user based on the estimated positions.

2. The wearable device of claim 1, wherein the movement of the location on the wearable device with respect to the corresponding location on the body part of the user is selected from a group comprising: detachment of the wearable device from the user's body part, slip of the wearable device from the user's body part, or both detachment of the wearable device from the user's body part and slip of the wearable device from the user's body part.

3. The wearable device of claim 1, further comprising:
   an additional illumination source configured to illuminate a portion of a surface external to an exterior of the wearable device;

an additional optical sensor configured to capture a plurality of images of the illuminated portion of the surface; and the controller further configured to:
identify differences between some of the plurality of images, the differences corresponding to movement of the wearable device with respect to the surface, and determine estimated position data based in part on the identified differences.

4. The wearable device of claim 3, wherein the additional optical sensor is located on an area selected from a group comprising: a portion of the wearable device near a fingertip of the user, multiple portions of the wearable device near multiple fingertips of the user, a portion of the wearable device near a finger pad of the user, multiple portions of the wearable device near multiple finger pads of the user, and some combination thereof.

5. The wearable device of claim 3, wherein the one or more identified actions performed by the user are selected from a group comprising: repositioning a cursor within content presented to the user, selecting content presented to the user, navigating through content presented to the user, typing action performed by the user, and some combination thereof.

6. The wearable device of claim 1, wherein the wearable device includes an article of clothing.

7. The wearable device of claim 1, wherein the controller is further configured to:
identify differences between some of the plurality of images, the differences corresponding to movement of the illuminated portion of skin, and
determine estimated position data for the body part based in part on the identified differences.

8. The wearable device of claim 7, wherein the movement of the illuminated portion of skin comprises at least bending of a particular joint of the body part.

9. The wearable device of claim 1, wherein the controller is further configured to:
identify common features of different images of the plurality of images;
identify differences between the common features in the different images of the plurality of images; and
determine estimated position data based in part on the identified differences between the common features.

10. The wearable device of claim 1, wherein the controller is further configured to:
select a set of images from the plurality of images based on the identified differences;
generate a corresponding set of displacement vectors based on the selected set of images; and
generate a total displacement vector based on the generated set of displacement vectors, the total displacement vector indicating a change in position of the wearable device relative to the user.

11. The wearable device of claim 1, wherein the portion of skin is selected from a group consisting of: a portion of skin around a joint of the user's finger, a portion of skin around fingertip of the user's finger, a portion of palmar skin of the user's hand, a portion of dorsal skin of the user's hand, or some combination thereof.

12. The wearable device of claim 1, wherein a resolution of the imaging device is at most 16×16 pixels.

13. The wearable device of claim 1, wherein the imaging device is configured to capture video with a frame rate of at least 1 kilo-Hertz.

14. A system comprising:
a wearable device that tracks movement of the wearable device with respect to a user's skin, comprising:
an illumination source integrated with the wearable device coupled to a virtual reality console, the illumination source configured to illuminate a portion of skin of the user, wherein a location on the wearable device is in contact with a corresponding location of a body part of the user, and
an optical sensor integrated with the wearable device and configured to capture a plurality of images of the illuminated portion of skin; and
a controller configured to:
identify differences between some of the plurality of images, the differences corresponding to movement of the wearable device with respect to the illuminated portion of skin,
determine estimated position data for the wearable device based in part on the identified differences,
generate content based in part on the determined estimated position data, and
determine that the location on the wearable device has moved with respect to the corresponding location on the body part of the user based on the determined estimated positions; and
an electronic display configured to display the generated content to the user.

15. The system of claim 14, wherein the movement of the location on the wearable device with respect to the corresponding location of the body part of the user is selected from a group comprising: detachment of the wearable device from the user's body part, slip of the wearable device from the body part, and both detachment of the wearable device from the body part and slip of the wearable device from the body part.

16. The system of claim 15, wherein responsive to determining that the wearable device has slipped from the body part, the controller is further configured to:
determine an offset between generated content associated with the movement of the wearable device and a true pose of the body part for compensating changes of the wearable device configuration.

17. The system of claim 15, wherein responsive to determining that the wearable device has detached from the body part, the controller is further configured to:
generate content indicating the wearable device has lost contact with the body part for presentation.

18. The system of claim 14, further comprising:
an additional illumination source configured to illuminate a portion of a surface external to an exterior of the wearable device;
an additional optical sensor configured to capture a plurality of images of the illuminated portion of the surface; and
the controller further configured to:
identify differences between some of the plurality of images, the differences corresponding to movement of the wearable device with respect to the surface,
determine estimated position data for the finger based in part on the identified differences, and
determine one or more actions performed by the user associated with content presented to the user based in part on the movement of the wearable device.

19. A method comprising:
illuminating, using an illumination source integrated with a wearable device, a portion of skin of a user, wherein a location on the wearable device is in contact with a corresponding location on a body part of the user;

capturing, using an optical sensor integrated with the wearable device, a plurality of images of the illuminated portion of skin;

identifying differences between some of the plurality of images, the differences corresponding to movement of the wearable device with respect to the illuminated portion of skin;

determining estimated position data for the wearable device based in part on the identified differences; and determining that the location on the wearable device has moved with respect to the corresponding location on the body part of the user based on the estimated positions.

20. The method of claim 19, further comprising:

generating content based in part on the determined estimated position data, and displaying the generated content to the user.

* * * * *